United States Patent
Schamberg et al.

(10) Patent No.: US 6,224,755 B1
(45) Date of Patent: May 1, 2001

(54) COFFEE MAKER

(75) Inventors: Stefan Schamberg, Usingen; Reinhard Stücher, Freudenberg; Bernd Trebitz, Butzbach; Christof Kleemann, Kronberg; Georges Driesen, Weilrod; Klaus Amsel, Schmitten, all of (DE)

(73) Assignee: Braun Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 08/974,478

(22) Filed: Nov. 20, 1997

Related U.S. Application Data

(63) Continuation of application No. PCT/EP95/04112, filed on Oct. 20, 1995.

(30) Foreign Application Priority Data

Jun. 1, 1995 (DE) .............................. 195 20 121

(51) Int. Cl.[7] .................................................. A47J 31/02
(52) U.S. Cl. ........................... 210/149; 210/482; 99/305; 99/279
(58) Field of Search .............................. 99/279, 293, 294, 99/299, 305, 320, 323; 210/473, 474, 477, 482, 149

(56) References Cited

U.S. PATENT DOCUMENTS

| | | |
|---|---|---|
| 1,838,206 | * 12/1931 | Alaj . |
| 3,333,527 | * 8/1967 | Bender . |
| 4,000,396 | * 12/1976 | Abel, Jr. . |
| 4,055,114 | * 10/1977 | Kats et al. . |
| 4,262,585 | * 4/1981 | Leuschner et al. . |
| 4,667,584 | * 5/1987 | Koyama et al. . |
| 4,793,245 | * 12/1988 | Kimura . |
| 4,922,809 | * 5/1990 | Fuhner . |

FOREIGN PATENT DOCUMENTS

| | | |
|---|---|---|
| 469847 | 12/1928 | (DE) . |
| 1 166 988 | * 4/1964 | (DE) . |
| 2 058 824 | * 6/1971 | (DE) . |
| 28 11 497 | * 9/1979 | (DE) . |
| 28 56 491 | 1/1980 | (DE) . |
| 29 52 556 | 7/1981 | (DE) . |
| 42 40 429 | 6/1994 | (DE) . |
| 0 101 606 | 2/1984 | (EP) . |
| 0 484 060 | 5/1992 | (EP) . |
| 2 419 704 | 10/1979 | (FR) . |
| 2 113 813 | 8/1983 | (GB) . |

OTHER PUBLICATIONS

Copy of International Search Report dated Jan. 23, 1996.

* cited by examiner

*Primary Examiner*—Joseph W. Drodge
*Assistant Examiner*—Terry K. Cecil
(74) *Attorney, Agent, or Firm*—Fish & Richardson P.C.

(57) ABSTRACT

A coffee maker and a method of preparing coffee in which steam is applied to the coffee grinds prior to passing hot water through the coffee grinds. The coffee maker includes a controllable outlet valve disposed within a fluid path, between a water reservoir and a flow-through heater. In a first position, the outlet valve has a flow opening dimensioned sufficiently small that water exiting the outlet valve evaporates completely in the flow-through heater. In a second position, the outlet valve has a flow opening dimensioned sufficiently large that water exiting the outlet valve is heated in the flow-through heater without appreciable development of steam.

18 Claims, 4 Drawing Sheets

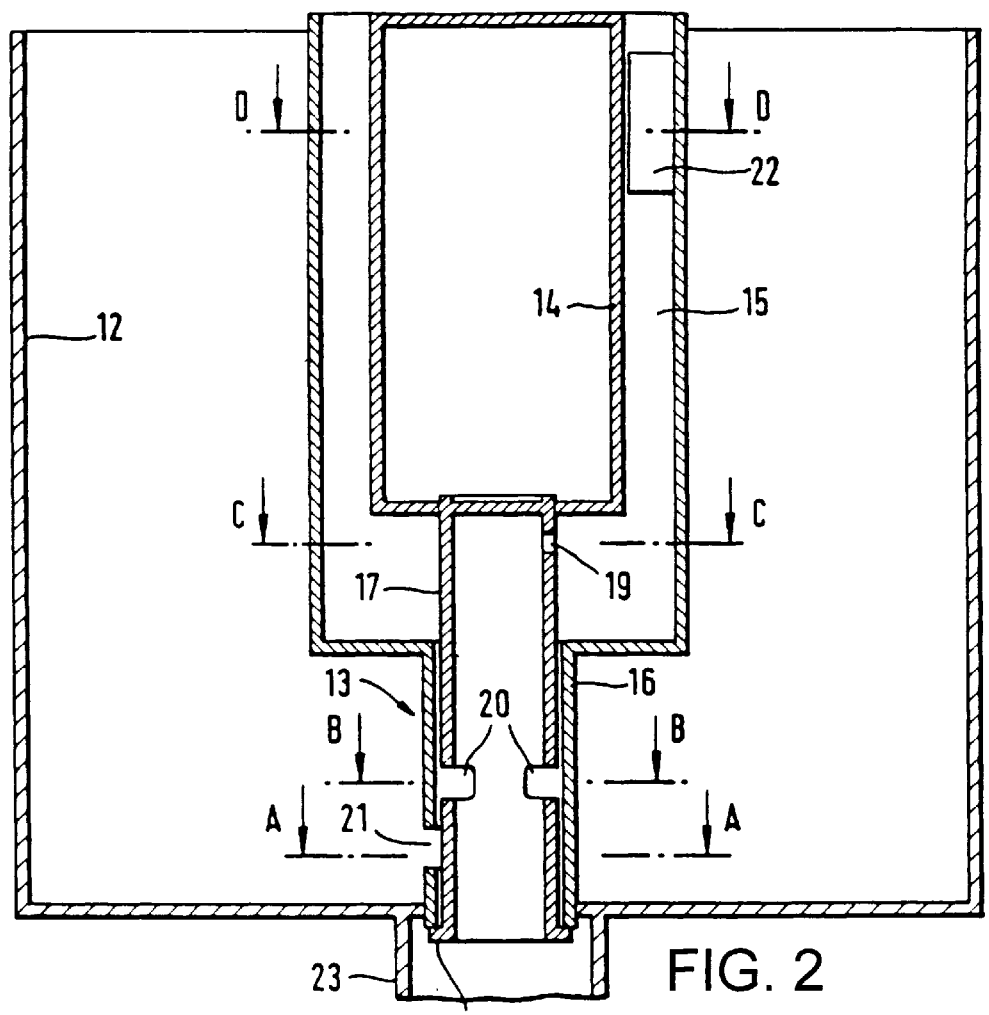
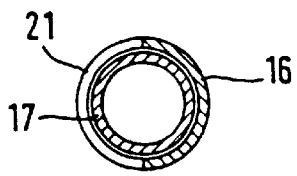
FIG. 3
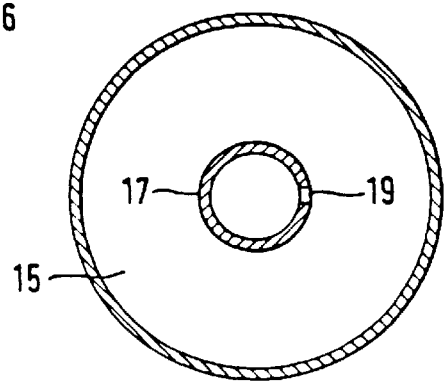
FIG. 5
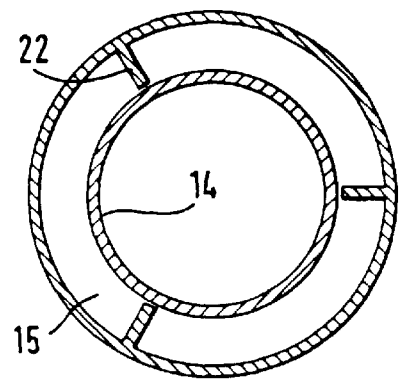
FIG. 6
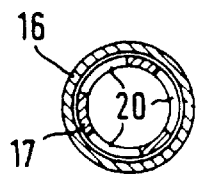
FIG. 4

COFFEE MAKER

This application is a continuation of PCT/EP95/04112, filed Oct. 20, 1995.

BACKGROUND OF THE INVENTION

This invention relates to a method of preparing coffee in which hot water flows through the coffee grinds. This invention further relates to a coffee maker for implementing this method.

Typically, coffee is prepared using devices comprising a water reservoir and an electric flow-through heater, in which heated water is fed down into a filtering device filled with the coffee grinds for extraction. The problem encountered with this method is that the amount of water of about 80 ml initially heated and delivered does not, as a rule, reach a temperature of 80° C., As a result, the relatively cold water is able to wet the surface of the coffee bed only poorly with equally poor extraction results, passing through the filtering device into the collection container nearly unchanged. In cases where major batches of coffee are being prepared, this initially weak and barely aromatic extract can be balanced out without significant loss of flavor by the subsequent large amount of extract which has an intensive aroma because of sufficiently hot water and a sufficiently long extraction interval. By contrast, however, when only minor batches as, for example, two or three cups of coffee, are being prepared, experts and amateurs alike tend to characterize this beverage as rather flat in aroma. The reason for this is that in the preparation of small batches the extraction interval is relatively brief, causing sparingly soluble substances as, for example, acids which contribute to enhancing the aroma significantly to go into solution not until after a lengthy extraction period, as a result of which the preparation of small batches allows only part of the aroma to unfold.

To avoid this disadvantage, it is known in the art to prolong the extraction interval in coffee making by interrupting the supply of hot water to the filtering device from time to time. An automatic coffee maker known from DE-AS 11 66 988 which employs a mesh filter receiving the ground coffee provides for a continuous supply of hot water, with an electromagnetically operated valve being inserted in the discharge conduit leading to the mesh filter for enabling the discharge of hot water to be interrupted from time to time. The switch controlling the electromagnetic valve is actuated through two cam disks seated on a shaft which is rotated by means of a motor. The disadvantage of this known automatic machine is that it requires a motor for driving the camshaft, and further that its high-temperature water heater is constantly exposed to steam pressure; both the motor with the camshaft and the high-temperature water heater with its necessary safety devices are costly units which is the reason why this automatic machine is only suitable for commercial use.

Further, from DE-AS 20 58 824 a device for the preparation of coffee is known in which the main heating element can be set to a selected off-temperature by means of a scale on the thermostat corresponding to a preselected amount of brewing water, and can be turned off automatically by thermostat response for specified delivery pauses, with an approximately constant total brewing time for each preselected amount of brewing water. In this coffee maker, the water supplied to the brew vessel is invariably maintained in contact with the coffee bed for about the same length of time, independent of the amount of coffee being prepared, so that a strong coffee with an intensive flavor is obtainable for any amount.

Still further, an espresso maker is known from DE-A-42 40 429 in which a device for preheating the filter centrifuge is provided. In this arrangement, a valve controlling the passage of water is inserted upstream from the heated flow-through heater. Use of the reduced sectional area of orifice of the valve produces steam to heat the filter centrifuge, whilst use of the full sectional area of orifice causes hot water to be produced for brewing coffee. To heat the filter centrifuge, steam is initially directed through a riser to a collection container whence it is introduced through a vent pipe into the housing surrounding the filter centrifuge. As this occurs, the rotary container holding the coffee grinds is heated from outside to prevent the coffee beverage brought into contact with the preheated shell of the rotary container during centrifuging from cooling too rapidly.

Finally, from DE-28 11 497 C2 a coffee maker is known in which, in order to generate steam, first an amount of water per unit of time smaller than the amount subsequently needed for the brewing cycle proper is removed from the water reservoir. Accordingly, during presteaming the outlet valve is in a first position in which its sectional area of orifice for passage of the water is only small. As a result, such a low amount of water is allowed to exit as it evaporates completely in the flow-through heater, with a continuous development of steam setting in. The steam travels through the riser to the filtering device filled with coffee grinds, contacting the coffee grinds. Subsequently, after the outlet valve is moved to a second position for commencing the brewing cycle in which hot water instead of steam is delivered to the coffee bed, the coffee grinds contacted with steam can be wetted with the hot water in a manner ensuring a speedy and effective extraction whereby a flavor-intensive hot beverage is obtained, in particular also in cases where small batches of coffee are prepared.

SUMMARY OF THE INVENTION

It is an object of the present invention to provide a method enabling the preparation of a flavor-intensive coffee in a simple manner, particularly with small batches. It is another object of the present invention to provide a coffee maker which is suitable for implementing this method, affords ease and economy of manufacture and is able to produce also small batches of aromatic and tasty coffee with a high yield of the coffee grinds.

According to the present invention, these objects are accomplished by the application of steam or a mixture of steam and hot water to the coffee grinds prior to passing the hot or boiling water in an at least substantial amount through the coffee grinds. In the method of the present invention, thermal energy in the form of steam or a mixture of steam and hot water is supplied to the coffee grinds right at the beginning of the extraction cycle. Surprisingly, it has shown that this added introduction of energy prepares the coffee grinds better for the subsequent extraction cycle with water, increasing the solubility of the flavor-producing substances in the coffee grinds. The measurable extraction content and an evaluation of the quality of the coffee beverage prepared according to this invention by sensory testing revealed, in particular where small batches were prepared, a significant improvement over coffee beverages prepared according to a method which does not include the step of presteaming the coffee grinds.

By reason of a forerun of a mixture of steam and hot water in the coffee grinds, the coffee grinds are heated at a substantially faster rate than would be the case if purely steam were applied to the coffee grinds. This approach results in a significantly enhanced extraction of aromatics from the coffee grinds. In combination with the application of steam, a kind of "coffee house fragrance" is evoked as early as at the beginning of the brewing cycle proper in the kitchen or the room where coffee is being made, inciting an operator to drink coffee. The application of steam or the application of a mixture of steam and hot water to the coffee grinds and the subsequent brewing cycle generally known in the art combine to produce a consistently good coffee aroma, independent of the amount of coffee made. Also, a significant improvement in flavor is thereby obtained, above all with small batches, that is, particularly where small batches of coffee are brewed the coffee grinds are utilized to an extent normally possible only with large batches of coffee to be brewed.

It has proven to be particularly suitable to apply steam to the coffee grinds for an interval of 30 to 90 seconds. In contrast to the known interruption of extraction, the method of the present invention appreciably reduces the cycle time, particularly where small batches are brewed. Moreover, the present invention relates to a coffee maker with a flow-through heater having its water inlet connected to the water reservoir through a check valve while its water outlet communicates through a riser with a filtering device receiving the coffee grinds, so that hot water that enters the filtering device extracts aromatics from the coffee grinds, being discharged as a coffee beverage from the filtering device into a collection container placed underneath.

According to a first aspect of invention, an outlet valve that is controlled by the temperature of the steam can be put into practice in the coffee maker without necessitating any major engineering effort. In this embodiment, the outlet valve does not switch to its second position until after a predetermined time period has elapsed for which the coffee grinds have been in contact with steam or a mixture of steam and hot water. Thereby a temperature-responsive valve control device of particularly straightforward construction and reliability in operation is controlled, which switches after a predetermined time period the inflow of cold water from the water reservoir to the flow-through heater from the small sectional area of orifice to the large sectional area of orifice. In this embodiment, the valve control device operating in dependence upon the temperature of the steam sits together with the outlet valve in a transverse tube providing direct communication between the water inlet and the water outlet, hence extending substantially parallel to the flow-through heater.

However, a valve control device of this type may also employ electric means, using an electric temperature sensor arranged at the water outlet to control an electromagnetically actuatable outlet valve. In this embodiment, the locations of the water inlet and water outlet in the coffee maker are of minor importance because the temperature sensor and the valve may be spaced apart any desired distance, being connected with each other only through electrical leads.

The temperature-sensitive member can be fabricated from a "shape memory metal" or a bimetal. The "shape memory metal" or "shape memory alloy" is preferably a nickel-titanium alloy. Such metals do not deform until a predetermined temperature is reached, similar to a catch spring, causing the outlet valve to open abruptly. This is necessary because an outlet valve that opens gradually would open more and more already after a short period, causing too large an amount of water to enter the flow-through heater with the risk of producing insufficient steam and, prematurely, too much hot water in the flow-through heater. In the other extreme, the valve would be required to open very slowly which would delay the beginning of the brew cycle. These disadvantages are eliminated by the "shape memory metal" which opens abruptly at a predetermined temperature.

The outlet valve is moved into its closed position automatically by the force of the return spring when the "shape memory metal" contracts abruptly upon cooling.

To enable the "shape memory metal" to be controlled at the tubular section in dependence upon the temperature of the steam, provision is made for the following features. To prevent the temperature from acting all too rapidly on the "shape memory metal", the metal member is surrounded by a sleeve having its one end sealed by a wall. In this arrangement, the thickness of the wall is dimensioned such that the "shape memory metal" causes the orifice of the outlet valve to open after a predetermined period of time has elapsed.

A particularly simple outlet valve can be obtained which in its closed position seals off the large sectional area of orifice while the small sectional area of orifice is maintained open.

By means of the features of an embodiment of the invention, a particularly simple valve seat is provided in the tubular section, serving at the same time a guiding function for the tappet and extending through an opening formed in the tubular section into the channel, thereby controlling the passage of water to the flow-through heater.

Preheating of the coffee grinds can be accomplished by wetting the coffee grinds with some water prior to their being contacted with steam. In the generation of steam, the flow-through heater's heat output is not reduced for the sake of simplicity. The flow-through heater continues being temperature-controlled by the thermostat, that is, the heat produced at the flow-through heater during the steaming cycle must not be so high as to result in the thermostat turning the flow-through heater off. For improved temperature control of the steaming and hot water cycles, however, it is also possible to provide the flow-through heater with two thermostats, whereof the one thermostat which responds at an elevated temperature controls the steaming cycle while the other thermostat which responds at a lower temperature controls the brewing cycle proper.

In order to be able to affect the development of steam the instant the appliance is turned on, the outlet valve of the water reservoir is controllable so as to be closed when in its normal position and, when the flow-through heater is turned on, to be opened to allow passage through a small sectional area of orifice. It is thereby ensured that the flow-through heater remains dry when the water is reservoir is filled and is not filled to capacity with water until the temperature necessary for evaporation is reached.

Another aspect of the present invention, the outlet valve may be comprised of a single valve or of two valves with different sectional areas of orifice controllable independently of one another or jointly.

Another aspect of the present invention, control of the outlet valve may be effected by a float incorporating the following features. The float may be arranged in a float chamber disposed in the water reservoir and communicating therewith, the float chamber being connected with the small sectional area of orifice of the outlet valve and having a capacity corresponding to the amount of water necessary for producing the desired amount of steam. In this configuration, the float rises due to buoyant force when the water reservoir is filled with water, causing the outlet valve to be moved into a first position in which its small sectional area of orifice is open while its large sectional area of orifice is closed. When the amount of water provided in the float chamber for a corresponding steam application interval drops to a low level, the outlet valve is moved to a second position allowing the remaining water to be drained from the water reservoir through the large sectional area of orifice.

Provisions may also be made for the outlet valve to be comprised of two telescoping sleeves movable axially towards each other and having two groups of radial valve orifices arranged in such manner that in a first position the valve orifices of the one group, and in a second position the valve orifices of the other group form the respective sectional area of orifice. This outlet valve affords ease and economy of manufacture. Control of the outlet valve may also be by an electric motor or as a function of time. Such a control can be linked in simple manner with the activation of the heating element of the flow-through heater.

The following features result in a particularly simple actuation of the valve device in dependence upon the flow of water from the water reservoir to the flow-through heater. As water is passing through, the small sectional area of orifice is varied in that the valve tappet provided with an impeller wheel is turned in a threaded bushing in dependence upon the flow until the tappet opens the orifice either fully or with a section of reduced diameter only, so that a large sectional area of orifice results which then no longer produces steam in the flow-through heater, but only boiling water. In this arrangement, the thread is required to have a relatively large clearance to prevent it from jamming in the event of contamination. This embodiment is particularly easy to manufacture because all parts are molded from plastics material.

Several embodiments of the present invention will be described in more detail in the following with reference to the accompanying drawings.

BRIEF DESCRIPTION OF THE DRAWINGS

FIG. 2 is a view of a water reservoir with a float-controlled outlet valve according to a second invention for a coffee maker of FIG. 1, in which however only one outlet orifice of increased cross-section is formed on the water reservoir;

FIG. 3 is a section of the water reservoir taken on the line A—A of FIG. 2;

FIG. 4 is a section of the water reservoir taken on the line B—B of FIG. 2;

FIG. 5 is a section of the water reservoir taken on the line C—C of FIG. 2;

FIG. 6 is a section of the water reservoir taken on the line D—D of FIG. 2;

DETAILED DESCRIPTION

Figure 1:
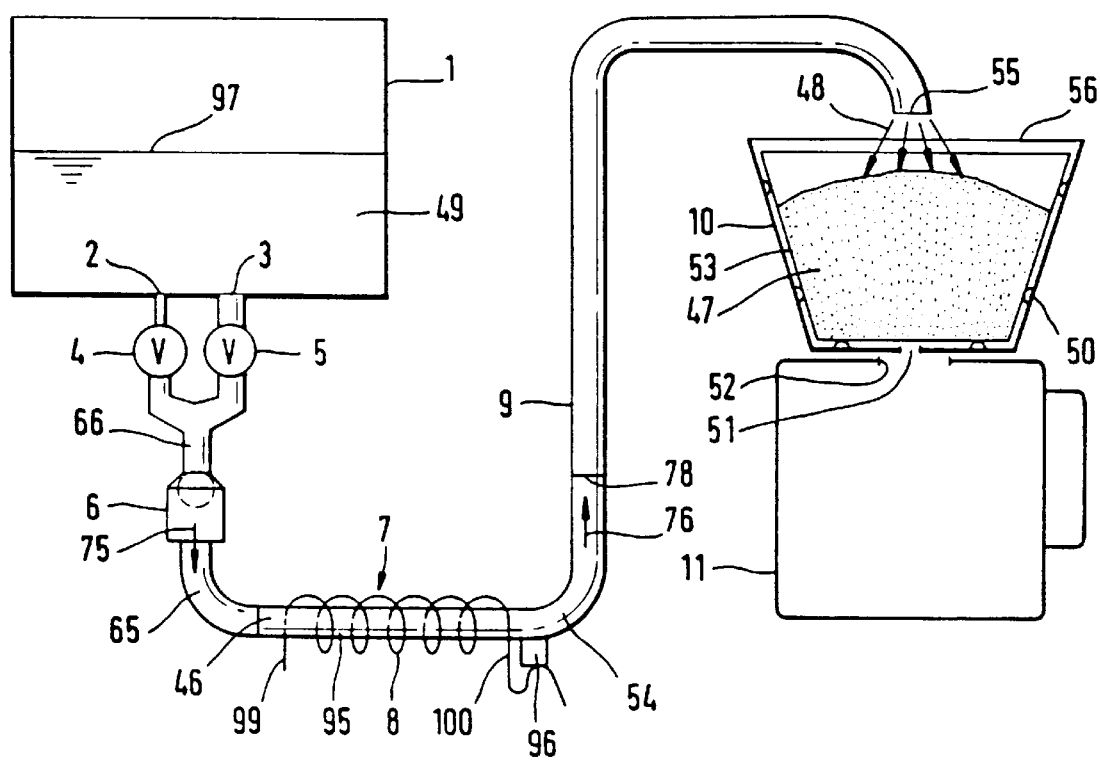
FIG. 1 is a schematic illustration of a coffee maker having an outlet valve assembly comprised of two electromagnetic valves.

The coffee maker illustrated schematically in FIG. 1 includes a water reservoir 1 adapted to be filled with water 49 and having outlet ports 2, 3 closable each by a respective valve 4, 5. The outlets of the two valves 4, 5 are jointly connected through a conduit 66 to a check valve 6 inhibiting flow in the direction of the valves 4, 5. The check valve 6 has its outlet end connected to a pipe 65 which in turn is connected to a water inlet 46 of a flow-through heater 7 comprising a heating element 8.

Extending from the flow-through heater 7 through a water outlet 54 is a riser 9 leading to a coffee filtering device 10 disposed above a carafe 11. The outlet 55 of the riser 9 is disposed above the filter opening 56 and above the coffee grinds 47. The filtering device 10 has a spout 51 through which the filtrate enters the carafe 11 through the carafe's opening 52. Inserted in the filtering device 10 is a paper filter 53 of the type conventionally used in coffee makers, the paper filter being maintained at a small relative distance to the inner wall of the filtering device 10 by means of spacers 50 to enable the brew to flow towards the spout 51. The paper filter 53 holds the coffee grinds 47.

The outlet port 2 has a sectional area of passage dimensioned so small that with the valve 4 open the amount of water fed to the flow-through heater 7 per unit of time is so small that the water evaporates completely. The steam generated is directed through the riser 9 onto the coffee bed in the filtering device 10, heating and preparing the coffee grinds for subsequent extraction. The outlet port 3 has a sectional area of passage of conventional dimension as is suitable for heating and feeding by the formation of steam bubbles by means of the flow-through heater 7. The outlet port 3 is opened by means of the valve 5 as soon as the coffee grinds are sufficiently softened by the introduction of steam for subsequent extraction. Tests have shown that the application of steam to the coffee grinds for a period of between 30 and 90 seconds prior to brewing produces good results.

The valves 4, 5 are normally closed and are moved to their open position by means of electromagnets. As fresh water 49 is filled into the water reservoir 1, the flow-through heater 7 hence remains dry. As the appliance is switched on, the valve 4 is at the same time actuated to occupy an open position, so that first steam starts developing. By means of an electric or thermostatic timing element, the valve 5 is actuated to an open position at a predetermined later instant of time. Opening of the valve 5 causes a larger amount of water to enter the flow-through heater 7, thereby terminating the application of steam and initiating the usual brewing cycle. In this part of the operation cycle, the valve 4 may remain open. However, provision may also be made for terminating actuation of the valve 4 when control is taken by the valve 5, so that the valve 4 returns to its closed position.

FIGS. 2 to 6 show in cross-section a water reservoir 12 suitable for use in the coffee maker illustrated in FIG. 1 in lieu of the water reservoir 1 and the valves 4, 5. Provided at the base of the water reservoir 12 is an outlet valve 13 which is actuated by means of a float 14. The float 14 is in a float chamber 15 located inside the water reservoir 12 and connected to the base of the water reservoir 12 by an outer valve sleeve 16 having either end thereof open. A second valve sleeve 17 is longitudinally displaceably arranged in the valve sleeve 16. The float 14 is secured to the upper end of the valve sleeve 17. The lower end of the valve sleeve 17 has a collar 18 engaging the lower end of the valve sleeve 16 when the valve sleeve 17 is in an upper limit position. The upper end of the valve sleeve 17 is closed by the float 14. The lower end of the valve sleeve 17 is open.

The valve sleeve 17 has an upper valve orifice 19 and lower valve orifices 20. The valve orifice 19 has such a small sectional area of passage that water exits it only in drops, evaporating completely in a flow-through heater 7. The valve orifices 20 are dimensioned so large that the water 49 is heated and fed in the flow-through heater 7 of the coffee maker of FIG. 1 without any appreciable amount of steam developing. According to FIGS. 2 to 6, the valve orifices 20 cooperate with a valve orifice 21 provided in the outer valve sleeve 16 in the proximity of the base of the water reservoir 12. The float 14 has its upper end guided along ribs 22 of the float chamber 15.

The mode of operation of the water reservoir 12 of FIGS. 2 to 6 is as follows: As water is filled in, first the float chamber 15 and then the water reservoir 12 are filled. This causes the float 14 to occupy the upper limit position illustrated in FIG. 2 in which the valve orifices 20, 21 are closed. It will be seen that at this stage only water from the float chamber 15 in a small amount as governed by the small valve orifice 19 is allowed to be discharged through the bore in the valve sleeve 17 to the reservoir's outlet port 23. This effects a continuous development of steam in the flow-through heater. The float chamber 15 is dimensioned to such size that the supply of water held therein is used up upon completion of the desired steam development interval, causing the float 14 to be lowered to a level at which the valve orifices 20, 21 overlap and the valve orifice 19 is closed. Following this, water in sufficiently large amount is allowed to flow from the water reservoir 12 through the valve orifices 20, 21 into the bore of the valve sleeve 17 and through the reservoir's outlet port 23 to the flow-through heater, thereby terminating the development of steam and initiating the usual brewing cycle.

Figure 7:
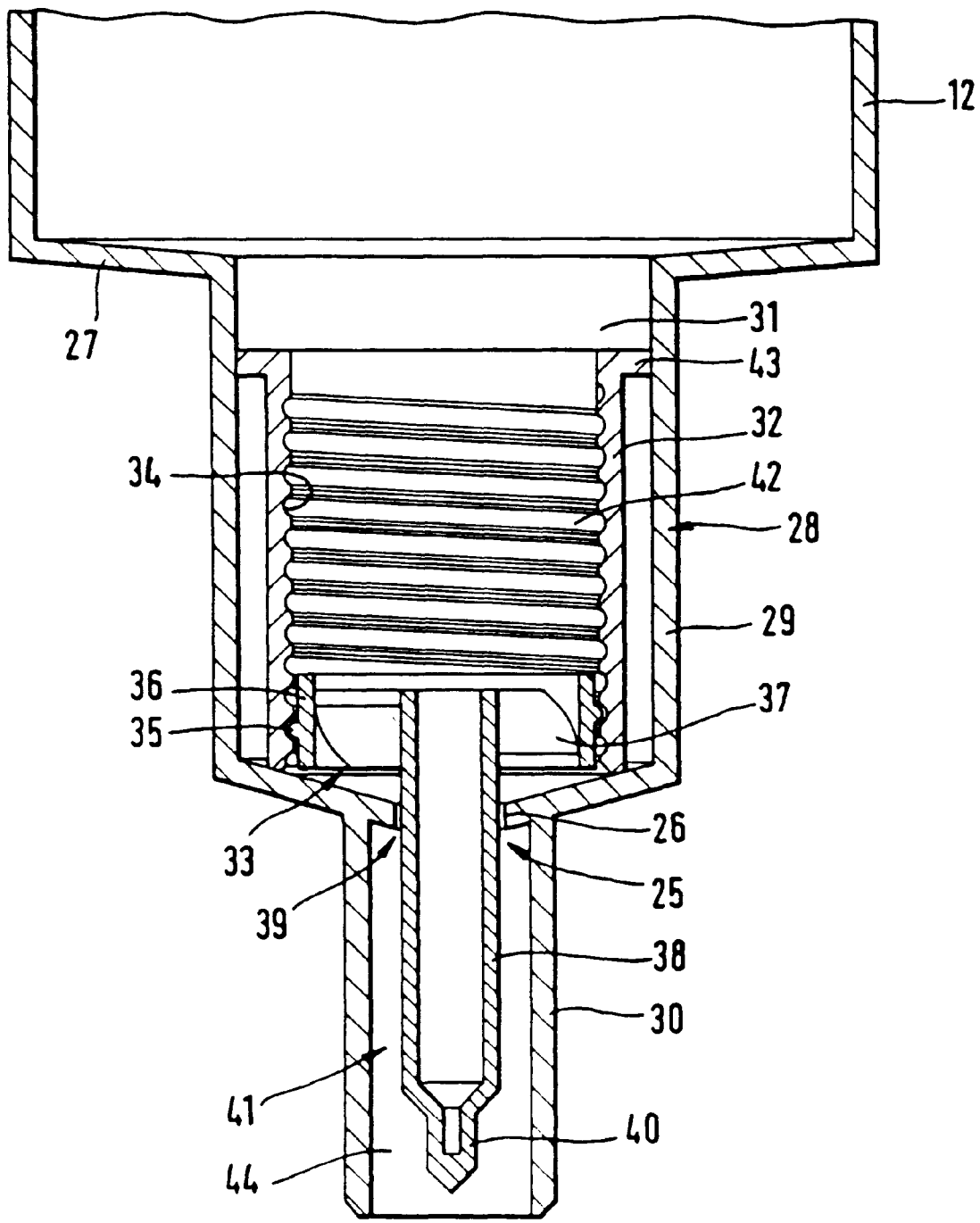
FIG. 7 is an enlarged longitudinal section of the flow-controlled valve device according to a third invention, illustrating a further embodiment thereof.

FIG. 7 illustrates a further embodiment of a valve device 25 comprising a tubular section 28 formed at the base 27 of the water reservoir 12 and providing an increased-diameter step 29 and a reduced-diameter step 30. The increased-diameter step 29 forms a chamber 31 in which a threaded bushing 32 is press-fitted in a manner preventing relative rotation. The threaded bushing 32 is internally threaded, preferably in the form of a round thread 34 which is rotatably connected with a mating thread 35 of an impeller wheel 33. The round thread arrangement 34, 35 enables the impeller wheel 33 to run with particularly low friction. The thread 35 of the impeller wheel 33 is formed on the outer circumference of a bushing 36 having on its inner circumference blades 37 which are spaced uniformly apart and have their radially inner ends connected with a spigot 38 extending concentrically with the thread 34.

At the transition from step 29 to step 30 the spigot 38 extends through an opening 39 forming with the spigot 38 the small sectional area of orifice 26. In FIG. 7 the spigot 38 provides at its lower end a mandrel 40 of reduced diameter which, when the spigot 38 has traveled upwards in the threaded bushing 32 through the thread arrangement 35, 36 of FIG. 7, forms with the bore 39 the large sectional area of orifice which, however, is not illustrated in the Figure. The bushing 36 combines with the blades 37, the spigot 38 and the mandrel 40 to provide the closure member proper of the valve device 25, that is, in the first position shown in FIG. 7 the closure member 41 provides with the opening 39 the small sectional area of orifice 26, whilst in the second position in which the mandrel engages the opening 39 the large sectional area of orifice is produced.

The mode of operation of the valve device of FIG. 7 is the following:

As the reservoir 12 is filled with water, water flows into the chamber 31 and into the space 42 formed by the threaded bushing 32 because the threaded bushing 32 has its upper end in sealing engagement with the tubular section 28 of increased diameter 29 through an annular collar 43. Water then flows from the space 42 through the blades 37 and onwards through the small sectional area of orifice 26 into the space 44 of the tubular section 28 of the reduced-diameter step 30. The reduced-diameter step 30 is connected, through a check valve 6 as illustrated in FIG. 1, with a flow-through heater 7 having its outlet in communication with a riser 9. It will thus be seen that the valve device 25 shown in FIG. 7 is substituted for the valves 4, 5 shown in FIG. 1, so that the further description of the coffee maker may be dispensed with at this point.

The water passing through the small sectional area of orifice 26 and thus also through the blades 37 is moved in a flow causing the closure member 41 to be turned such as to be moved upwards in the threaded bushing 32 of FIG. 7 by means of the thread arrangement 35, 34. As a rule, it takes about 30 to 90 seconds for the closure member 41 to travel upwards a distance causing engagement of the mandrel 40 with the opening 39, thus producing an increased sectional area of orifice which then delivers water to the flow-through heater 7 in an amount in which water, rather than evaporating as is the case with the small sectional area of orifice 26, is heated to boiling temperature only, to be passed as hot water through the riser 9 to the filtering device 10.

During the first part of the extraction cycle in which the small sectional area of orifice 26 controls the valve device 25, only such an amount of water is fed to the flow-through heater 7, 8 (FIG. 1) as evaporates only, the resulting steam being thus passed through the riser to the coffee bed in the filtering device 10, preheating and moistening the coffee grinds in the process. As soon as this steam interval (lasting about 30 to 90 seconds) is terminated, boiling water flows onto the coffee bed, causing the extraction process to be started which, however, proceeds substantially more effectively than in a conventional brewing operation, because of the preceding operations of softening, preheating and moistening the coffee grinds by the introduction of steam.

Upon completion of the brewing cycle, that is, after all water is drained down from the valve device 25, the closure member 41 returns to the position shown in FIG. 7, either by hand using a mechanical adjusting device, or by gravity or some other actuating device.

Figure 8:
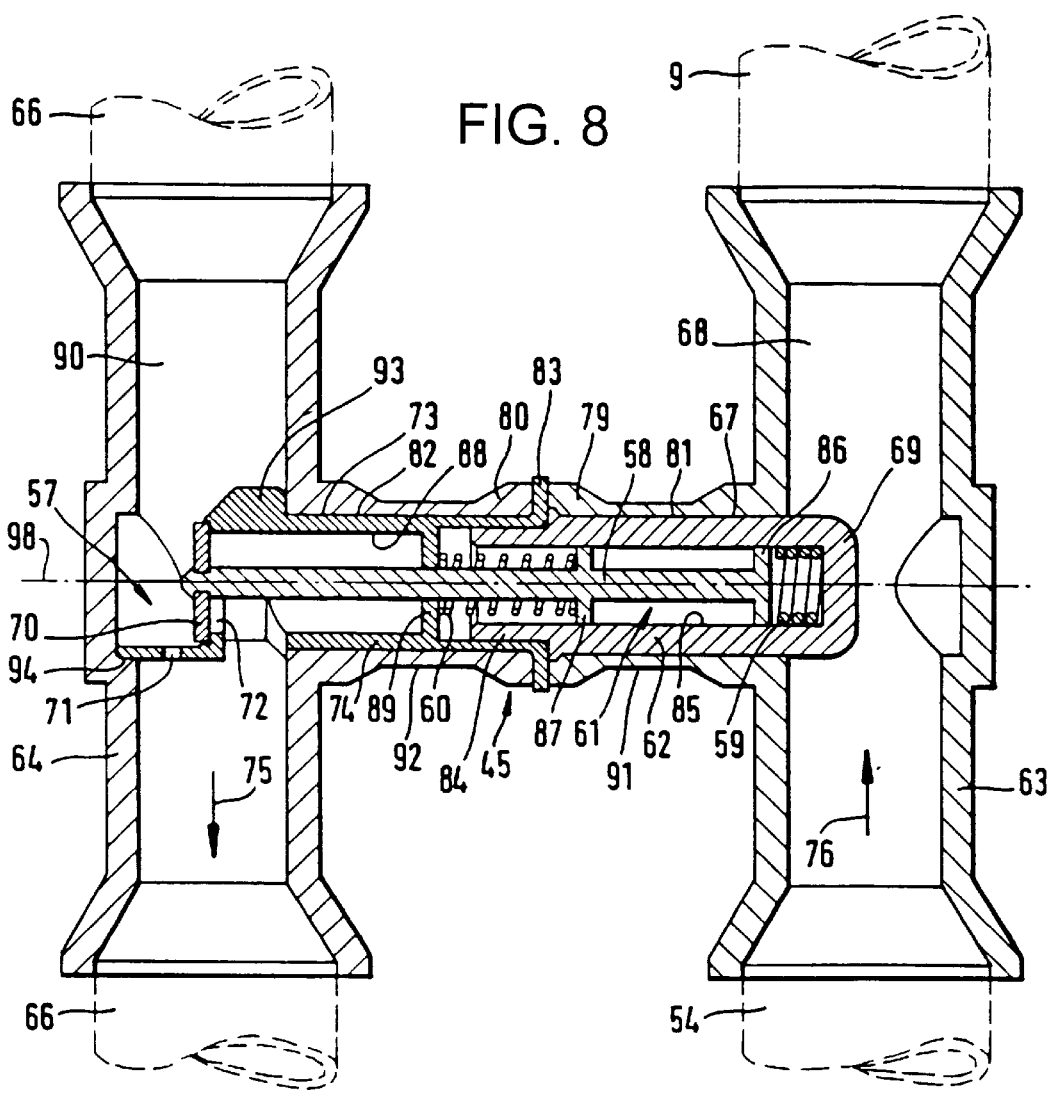
FIG. 8 is an enlarged longitudinal section of a bimetal-controlled valve control device according to a first invention.

Further, FIG. 8 shows a valve actuating device controlling the outlet valve 57 and substantially comprising two vertically spaced tubular sections 63, 64 in parallel arrangement. In FIG. 1, for example, the tubular section 64 is inserted in the conduit 66, while the tubular section 63 may be connected at the joint 78 between the water outlet 54 and the riser 9, that is, the tubular section 64 carries the cold water 49 arriving from the water reservoir 1, while the tubular section 63 directs the hot water or the superheated steam produced in the flow-through heater 7 to the coffee bed 47 (FIG. 1). The direction of flow of the cold water is indicated by arrow 75, while the direction of flow of the superheated steam or hot water is indicated by arrow 76.

In FIG. 8, the tubular sections 63, 64 include relatively aligned openings 67, 73 having adjoining tube sections 79, 80, respectively. The tube section 79 is provided with a bore 81 in which a sleeve 62 is press-fitted. The tube section 80 includes likewise a bore 82 in which a valve housing 74 is press-fitted. The valve housing 74 protrudes from the free end of the tube section 80, forming an annular collar 83 as it extends radially outwardly. Extending from the sleeve 62 into the valve housing 74 is an end section 84 which is equally press-fitted thereto. As a result, the sleeve 62, the valve housing 74 and the tube sections 79, 80 are fixedly connected with each other, the tube sections being in relative alignment providing a common center line 98. The sleeve 62 further includes a bore 85 in which two annular steps 86, 87 formed at the tappet 58 are slidably guided. The valve housing 74 has a bore 88 with an annular collar 89 at the opposite end of the end section 84, said collar being in sealing engagement with the surface of the tappet 58. Inserted between the annular collar 89 and the annular step 87 is a return spring 60 moving the outlet valve 57 into the closed position illustrated in FIG. 8 when the coffee maker is in the steam interval or is not being used. The closed position of the outlet valve 57 is understood to mean that the small sectional area of orifice 71 opens only the path from the water reservoir 1 to the flow-through heater 7 (FIG. 1).

Received in the bore 85 between the annular step 86 and the wall 69 sealing the sleeve 62 at the free end is a metal member 59 made of a "shape memory alloy" bearing against the wall 69 with one end and against the annular step 86 at the other end. Section 61 is sealed against the water-carrying conduits 68, 90 by the wall 69 at the one end and by the annular collar 89 at the other end.

The tube sections 79, 80 of FIG. 8 have each a restricted portion 91, 92, respectively, serving as elastic expansion elements when the coffee maker is in operation to enable the thermal expansion originating from the flow-through heater 7 and the conduits 66, 65, 54, 9 to be absorbed in this area.

In FIG. 8, the valve housing 74 projects with its end section 93 into the channel 90 of the tubular section 64 and takes support upon the edge of the wall through the step 94. The end section 93 thus forms in the channel 90 a wall establishing communication with the flow-through heater 7 (FIG. 1) only through the large sectional area of orifice 72 and the small sectional area of orifice 71.

The end of the tappet 58 remote from the metal member 59 is provided with a sealing means 70 configured as an annular disk which in the closed position illustrated in FIG. 8 seals the large sectional area of orifice 72. The sealing means 70 is fabricated from a flexible and water-resistant sealing material. The sleeve 62 is made of polypropylene or a similar low-cost plastic material. The same applies to the remaining components of the valve actuating device 45 shown in FIG. 8, with the exception of the return spring 60 and the metal member 59. The return spring 60 is made of spring steel wire, and the metal member 59 of a nickel-titanium alloy with shape memory properties.

The mode of operation of the valve actuating device 45 illustrated in FIG. 8 in combination with the coffee maker of FIG. 1, however without the valve 4, 5 shown in FIG. 1, is as follows:

As soon as the water reservoir 1 is filled with water 49, the water flows through the conduit 66 into the tubular section 64 and onwards, in a small amount, through the opening with the small sectional area of orifice 71. The outlet valve 57 is closed. The check valve 6 illustrated in FIG. 1 may be provided at either the inlet or the outlet end of the tubular section 64.

After the water has passed through the small sectional area of orifice 71, it flows through the intermediate pipe 65 into the flow-through heater 7 (FIG. 1), through the water outlet 54 into the tubular section 63, and finally into the riser 9, but only up to an elevation corresponding to the water level 97 of the water 49 held in the water reservoir 1. When the coffee maker is turned on by an on-off switch not shown in the drawings, current is supplied to the electrical heating element 8 through the connectors 99, 100, heating it. It is noted that the flow-through heater 7 comprises a water pipe 95 made of a metal conducting heat well, and a tubular heating element 8 made of aluminum or copper, for example, which is in close thermal contact therewith by a brazed or welded joint.

The heat produced in the tubular heating element 8 is transferred to the water pipe 95, heating the water held in the water pipe 95 until steam bubbles develop. In the process, the slight pressure increase occurring in the pipe 65 causes closing of the check valve 6, so that the steam bubbles (not shown) are only allowed to travel through the riser 9 to the outlet 55, entraining the water in the piping 95, 54, 63, 9 to the outlet 55. This still cold water (forerun) flows through the coffee grinds 47, wetting or moistening them. As soon as the amount of water banked up in the piping becomes less, less water can be supplied through the small sectional area of orifice 71. By reason of the relatively high heating output of the heating element 8, steam develops in the flow-through heater 7 in an amount such as to be directed at an increased flow rate to the outlet 55 and subsequently directly onto the surface of the coffee bed 47. As a result, the coffee grinds are heated not only on the outer surface on the side close to the outlet 55, but also towards the interior. Heating is further speeded by the water previously delivered to the coffee bed 47 (forerun).

The steam flowing through the tubular section 63 heats the area of the sleeve 62 extending into the channel 68, causing the sleeve to transfer part of the heat to the metal member 59 which thus heats up slowly As soon as the metal member 59 has reached its expansion temperature which with the dimensions and materials herein used corresponds approximately to a steam application interval of the sleeve 62 of between 30 and 60 seconds, the metal member 59 expands abruptly, displacing as it expands the tappet 58 to the left when viewing FIG. 8 against the restoring force of the return spring 60. As this occurs, the sealing means 70 is displaced by the tappet 58 until the large sectional area of orifice 72 is opened, the water then flowing from the water reservoir 1 through both the small and the large sectional area of orifice 71 and 72, respectively, to the flow-through heater 7.

Because a substantially increased amount of water is then supplied to the water pipe 95 through the added opening of the large sectional area of orifice 72 of the outlet valve 57, predominantly only water is heated and delivered to the outlet 55 in batches through the steam bubbles occurring while the water is being heated, as is the case with the self-feeding flow-through heaters of conventional coffee makers. The pre-steaming operation is terminated, and the actual brewing cycle has started.

The hot water then striking the surface of the coffee bed 47 (FIG. 1) is received by the moistened and preheated coffee grinds 47 in substantially improved fashion, enhancing extraction. The coffee beverage flowing out of the spout 51 of the filtering device 10 subsequently flows through the opening 52 into the carafe 11. The outlet valve 57 is maintained open as long as hot water is delivered from the flow-through heater 7 through the tubular section 63 to the outlet 55.

Upon completion of the brewing cycle, that is, when all of the water 49 is drained from the water reservoir 1, the last drops are expelled from the flow-through heater 7 by the formation of steam bubbles until the thermostat 96 which is in close thermal contact with and controls the flow-through heater 7 turns off the tubular heating element 8. When the channel 68 and hence also the area of the wall 69 of the sleeve 62 have cooled to a lower temperature, the metal member 59 contracts again abruptly. The restoring force of the return spring 6C then acts to move the tappet 58 back to the right when viewing FIG. 8, until the sealing means 70 closes again the large sectional area of orifice 72. The water reservoir 1 is again in communication with the water pipe 95 of the flow-through heater 7 only through the small sectional area of orifice 71. A new brewing cycle may be started.

Figure 9:
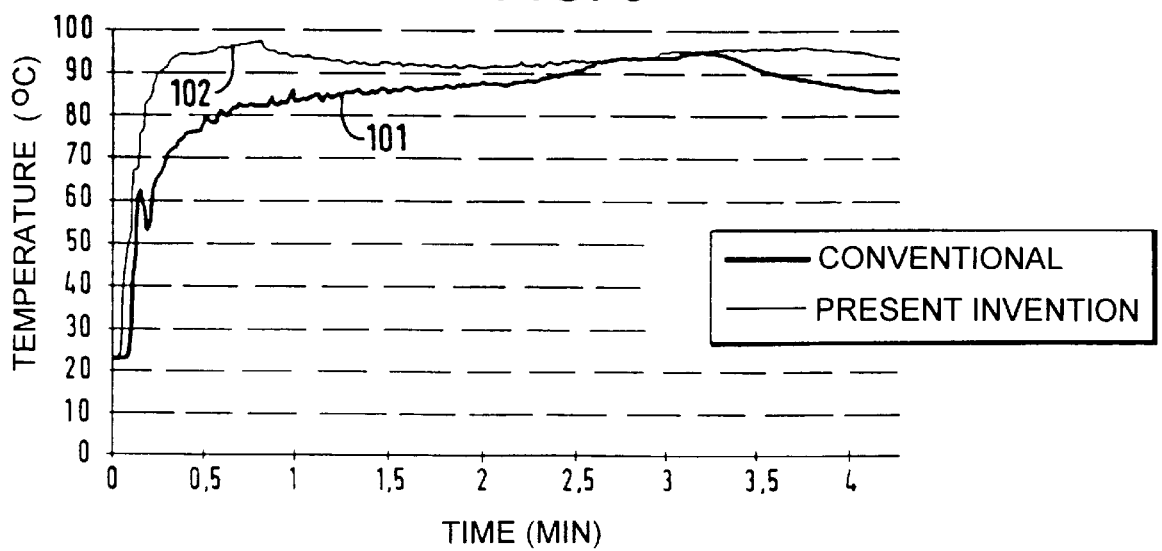
FIG. 9 is a graph of temperature against time showing temperatures in a conventional coffee maker and in a coffee maker operating according to the present invention.

FIG. 9 is a graph of temperature against time showing the temperature in a conventional coffee maker and the temperature in a coffee maker constructed in accordance with the present invention. The lower thick line 101 shows the temperature of the coffee grinds as a function of the brewing time for a conventional coffee maker, while the upper thin line 102 shows the temperature in the coffee grinds as a function of the brewing time for a coffee maker constructed according to the present invention.

As becomes apparent from the temperatures of FIG. 9, the temperature prevailing in the coffee grinds in the first minute after brewing has started is invariably higher in the coffee maker of the present invention than in a conventional coffee maker. The temperatures differ by about 18° C., max. The temperatures of the coffee grinds in the coffee maker of the present invention and in a conventional coffee maker approximate each other as brewing proceeds, which is explained by the fact that after about one minute the hot water reaching the coffee grinds is about as hot as in a conventional coffee maker. After about 2.5 minutes of brewing time have elapsed, the temperatures of the coffee grinds of both coffee makers are approximately equal. The effect accomplished by the present invention is that it is precisely at the beginning that the coffee grinds are heated and moistened by the superheated steam at a substantially faster rate than in a conventional coffee maker, which is of an advantage particularly in cases where small batches of coffee are made when the brewing cycle is completed in a very short period because of the low amount of water involved. With the present invention a good-tasting coffee beverage of consistently good aroma and low bitter principle is obtained, irrespective of the amount of coffee prepared.

What is claimed is:

1. A coffee maker comprising:
   a water reservoir;
   a filtering device for receiving coffee grinds;
   a fluid path disposed between said water reservoir and said filtering device;
   a flow-through heater disposed within said fluid path, said flow-through heater having a water inlet connected to said water reservoir, and a water outlet communicating with said filtering device so that hot water that enters said filtering device extracts aromatics from the coffee grinds and is discharged from said filtering device as a coffee beverage;
   a controllable outlet valve disposed within said fluid path between said water reservoir and said flow-through heater, said outlet valve having in a first position a flow opening dimensioned sufficiently small that water exiting said outlet valve evaporates at least partially in said flow-through heater, subsequently flowing as steam and a mixture of steam and hot water into said filtering device, and said outlet valve having in a second position a flow opening dimensioned sufficiently large that water exiting said outlet valve is heated in said flow-through heater without appreciable development of steam, flowing into the filtering device;
   an actuating device capable of switching said outlet valve from said first position to said second position; and
   a tube having a first end in fluid communication between said reservoir and said heater and a second end in fluid communication between said heater and said filtering device, said actuating device disposed within said second end, said outlet valve disposed within said first end and attached to said actuating device, said actuating device comprising a metal member which changes shape along the length of the tube in response to the temperature of the steam to switch the outlet valve from the first position to the second position after said actuating device has been exposed to steam for a predetermined period of time.

2. The coffee maker according to claim 1, wherein said actuating device comprises:
   a tappet, said tappet being movable between a first location and a second location, such that when said tappet is in its first location, said outlet valve is in said first position, and when said tappet is in its second location, said outlet valve is in said second position;
   said metal member engaging said tappet and when heated said metal member displaces said tappet from its first to its second location.

3. The coffee maker according to claim 2, wherein said metal member comprises a material selected from the group consisting of a shape memory alloy and a bimetal.

4. The coffee maker according to claim 2, wherein said actuating device further comprises a return spring, wherein said tappet is acted upon by said return spring, said return spring biasing said tappet to its first location.

5. The coffee maker according to claim 2, wherein said actuating device further comprises a sleeve, said metal member being disposed within a portion of said sleeve.

6. The coffee maker of claim 5, wherein said portion of said sleeve communicates with said flow path at a point in said flow path between said flow-through heater and said filter, such that said sleeve transmits heat from hot water and steam in said flow through path to said metal member.

7. The coffee maker according to claim 2, wherein said outlet valve has a large flow opening and a small flow opening, said tappet blocking said large flow opening when said tappet is in its first location.

8. The coffee maker according to claim 7, wherein said outlet valve further comprises a valve housing, said housing including said large and small flow openings.

9. The coffee maker of claim 8, further comprising a first tubular section housing a portion of said flow path, said first tubular section being located between said water reservoir and said flow-through heater, a portion of said valve housing extending into said first tubular section.

10. The coffee maker of claim 7, wherein said tappet further comprises a sealer, said sealer acting to sealingly block said large opening when said outlet valve is in said first position.

11. The coffee maker of claim 10, wherein said tappet comprises a first end comprising said sealer, and a second end engaging said metal member.

12. The coffee maker according to claim 1, wherein said water reservoir has a water outlet, said outlet being closed when said flow-through heater is off, and being open when said flow-through heater is on.

13. A coffee maker comprising:
   a water reservoir;
   a filtering device for receiving coffee grinds;
   a fluid path defining structure disposed between said water reservoir and said filtering device, said structure including a first wall portion having a first opening and a second wall portion having a second opening that is separate from and in addition to the first opening, both of which openings are for allowing water to flow from said water reservoir to said filtering device, said first opening being smaller than said second opening;

a flow-through heater disposed within said structure, said flow-through heater having a water inlet connected through said structure to said water reservoir, and a water outlet communicating with said filtering device so that hot water that enters said filtering device extracts aromatics from the coffee grinds and is discharged from said filtering device as a coffee beverage;

a controllable outlet valve disposed within said structure between said water reservoir and said flow-through heater, said outlet valve having a first position in which the outlet valve prevents any water from flowing through the second opening and allows water to flow through said first opening and a second position in which the outlet valve allows water to flow through the second opening, wherein the first opening is dimensioned sufficiently small so that water delivered to said heater only through said first opening evaporates at least partially in said flow-through heater, and subsequently flows as steam and a mixture of steam and hot water into said filtering device, and said second opening is dimensioned sufficiently large so that water delivered to said flow-through heater is heated by said heater without appreciable development of steam, and then flows into the filtering device; and an actuating device capable of switching said outlet valve from said first position to said second position, wherein said actuating device is controlled by the temperature of the steam and said actuating device switches said outlet valve from said first to said second position after said outlet valve has been exposed to steam for a predetermined period of time.

14. The coffee maker according to claim 13, wherein said actuating device comprises:

a tappet, said tappet being movable between a first location and a second location, such that when said tappet is in its first location, said outlet valve is in said first position, and when said tappet is in its second location, said outlet valve is in said second position;

a metal member engaging said tappet, said metal member having a shape which varies as a function of temperature, wherein heating said metal member causes said metal member to change shape and to displace said tappet from its first to its second location.

15. The coffee maker according to claim 14, wherein said metal member comprises a material selected from the group consisting of a shape memory alloy and a bimetal.

16. The coffee maker according to claim 14, wherein said tappet is acted upon by a return spring, said return spring biasing said tappet to its first location.

17. The coffee maker according to claim 14, wherein said actuating device further comprises a sleeve, said metal member being disposed within a portion of said sleeve.

18. The coffee maker according to claim 13, wherein said water reservoir has a water outlet, said outlet being closed when said flow-through heater is off, and being open when said flow-through heater is on.

\* \* \* \* \*